S. L. VINSON.
WRAPPING PAPER HOLDER.
APPLICATION FILED AUG. 29, 1911.
1,033,500.
Patented July 23, 1912.
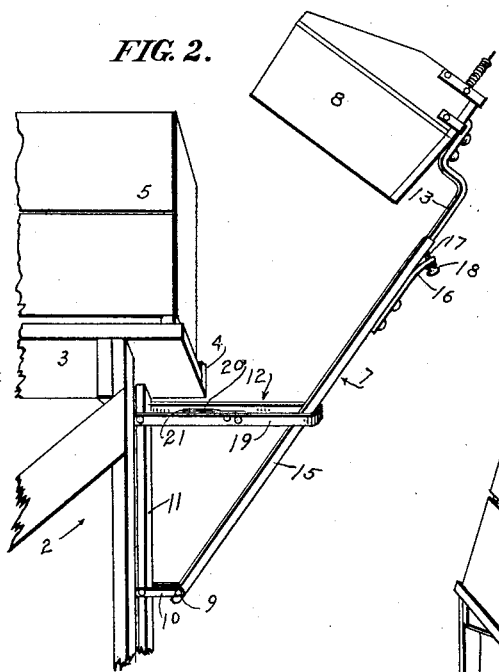
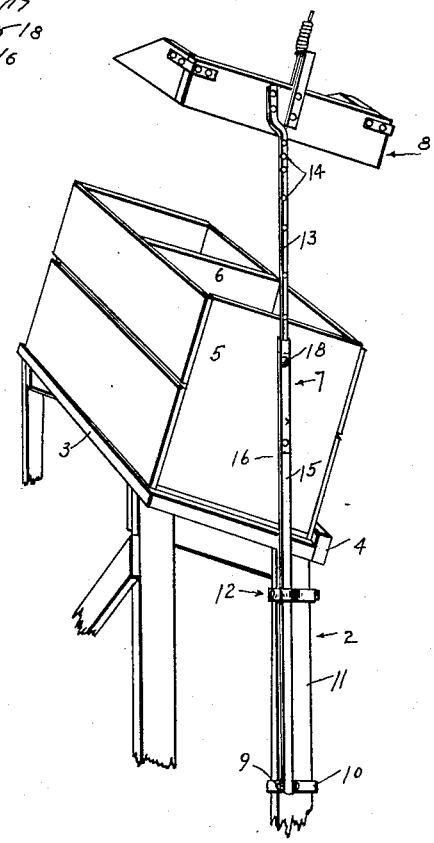
WITNESSES:
J. C. Sault
Fred. W. Brown.
INVENTOR:
Sherman L. Vinson.
BY
Alex. H. Lidders
ATTORNEY.

UNITED STATES PATENT OFFICE.

SHERMAN L. VINSON, OF ORANGE, CALIFORNIA, ASSIGNOR OF ONE-HALF TO GEORGE D. PARKER, OF RIVERSIDE, CALIFORNIA.

WRAPPING-PAPER HOLDER.

1,033,500.   Specification of Letters Patent.   Patented July 23, 1912.

Application filed August 29, 1911. Serial No. 646,727.

*To all whom it may concern:*

Be it known that I, SHERMAN L. VINSON, a citizen of the United States of America, residing at Orange, in the county of Orange, State of California, have invented a certain new and useful Wrapping-Paper Holder; and I do hereby declare the following to be a full, clear, and exact description of the invention, such as will enable others skilled in the art to which it appertains to make and use the same.

This invention relates to box stand with fruit wrapping-paper tray adjustably mounted thereon; and it may be said to consist in the provision of the novel features, and in the novel and improved construction, arrangement and combination of parts and devices as will be apparent from the description and claims hereinafter.

One object of the invention is to provide novel apparatus for holding the fruit wrapping-paper tray adjustably in position away from but adjacent to the box which is ordinarily placed on a stand while wrapped fruit is being packed therein; whereby is avoided the danger of bruising and damaging the fruit by the placing thereon of the wrapping-paper tray as is now done in the operation of packing fruit in the box.

Further objects of the invention are to provide novel and improved apparatus of the character specified which is simple in construction, cheap to manufacture, convenient and effective in use, and easy to manipulate.

Other objects and the advantages of the invention will be apparent to those skilled in the art from a consideration of the following description of one form of construction in which the invention may be embodied, taken in connection with the accompanying drawings, in which—

Figure 1 is a perspective view of a construction including apparatus for applying the invention, and Fig. 2 is a view of the apparatus from the rear of the box stand, the wrapping-paper tray being moved to be disposed endwise of the box.

The stand 2 may be of any approved form, one commonly used being provided with a top 3 inclined downwardly and forwardly and having an abutment 4 for holding nonslidably the box 5 that may be placed on the top 3.

In the operation of packing fruit, it is now common practice to place the wrapping-paper tray to one side, usually the left, on the top of the box 5 until the operator has wrapped and packed fruit — usually taken from a bin to the right of the stand 2 — sufficient to fill the box on one side of a central partition 6 usually provided in the box; then the tray is usually placed on the fruit in the bin while the box is being turned end for end, whereupon the tray is again placed in position at the left on the top of the box, now resting on the fruit already packed in the box, until the operator has wrapped and packed fruit sufficient to fill the box on the other side of the partition 6. It will be apparent that placing the wrapping-paper tray on the fruit in the bin or on the fruit packed in the box is very likely to bruise and consequently damage the fruit, and, as already stated, to avoid such damage to the fruit, it is an object of the invention to provide novel apparatus for mounting the wrapping-paper tray on the stand to occupy a position adjacent to but away from the box.

As shown, the apparatus may consist of an extensible rod 7 which carries at its upper end the wrapping-paper tray 8 and which has its lower end mounted on a pivot 9 on a bracket 10 affixed to an upright 11 of the stand, and a device 12 for guiding the rod 7 in its movement endwise of the box and for holding it in adjusted position. The extensible rod 7 may comprise an upper portion 13 having longitudinally thereof a plurality of openings 14 and adapted to slide within the lower portion 15 which has secured at the upper end thereof a spring finger 16 having at its free end a pin 17 which is provided with a grasp knob 18 and is adapted to be fitted into one of the openings 14 when the extension of the rod 7 is adjusted.

The wrapping-paper tray 8 may be of any approved construction, and, as shown, the rod 7 is preferably secured to the rear wall of the tray to have the latter, when the rod 7 is substantially vertical, inclined and substantially in parallel with the top of the stand.

The device 12 may consist of a substantially U-shaped member 19 the free ends of which are secured to the upright 11 above the bracket 10 and which has secured thereon a part 20 for holding the extensible rod 7 in substantially vertical position; the part 20 preferably consisting of a strip having a portion 21 thereof spaced from one of the legs of the members 19 to which it is secured to accommodate and hold the rod 7 between it and said leg.

From the foregoing the manner of use of the apparatus will be easily comprehended by those skilled in the art, it being apparent that the wrapping-paper tray may be either raised or lowered or moved endwise of the box 5 to suit the convenience of the operator in packing fruit into the box or in moving the box on or from the top 3 of the stand.

While one form of construction in which the invention may be embodied has been particularly illustrated and described, various changes and modifications thereof will readily occur to those skilled in the art and the right is therefore reserved to all such changes and modifications as do not depart from the spirit and scope of the invention as set forth in the appended claims.

I claim:

1. The combination of a stand, a fruit wrapping-paper tray, an extensible rod having the upper portion thereof secured to said tray and having the lower portion thereof pivotally connected with said stand, means on the lower portion of the rod including a pin adapted to fit in openings on the upper portion of the rod to adjust the extension of said rod, and a device for guiding said rod and for holding it in adjusted position, substantially as described.

2. The combination of a stand, a wrapping-paper tray, an extensible rod having one end portion thereof secured to said tray and having the other end portion thereof pivotally connected with said stand, means for locking together the parts of said rod when the extension of the rod is adjusted, and a device on said stand for guiding said rod and for holding it in adjusted position.

In testimony whereof, I have signed my name to this specification in the presence of two subscribing witnesses at Orange, county of Orange, State of California, this 21st day of August A. D. 1911.

SHERMAN L. VINSON.

Witnesses:
  GEO. M. HOENSHEL,
  S. M. CRADDICK.

Copies of this patent may be obtained for five cents each, by addressing the "Commissioner of Patents, Washington, D. C."